United States Patent [19]
Brown et al.

[11] Patent Number: 5,999,904
[45] Date of Patent: Dec. 7, 1999

[54] TRACKING INITIATIVE IN COLLABORATIVE DIALOGUE INTERACTIONS

[75] Inventors: Michael Kenneth Brown, North Plainfield; Jennifer Chu-Carroll, Ramsey, both of N.J.

[73] Assignee: Lucent Technologies Inc., Murray Hill, N.J.

[21] Appl. No.: 08/887,414

[22] Filed: Jul. 2, 1997

[51] Int. Cl.⁶ .................................................. G10L 7/08
[52] U.S. Cl. ........................................ 704/272; 704/200
[58] Field of Search ................................. 704/275, 270, 704/257, 231, 240, 258, 272, 253, 234, 266, 260, 235, 200, 201

[56] References Cited

U.S. PATENT DOCUMENTS

| | | | |
|---|---|---|---|
| 5,311,422 | 5/1994 | Loftin et al. | 364/578 |
| 5,357,596 | 10/1994 | Takebayashi et al. | 704/275 |
| 5,694,558 | 12/1997 | Sparks et al. | 345/326 |
| 5,748,841 | 5/1998 | Morin et al. | 704/257 |

OTHER PUBLICATIONS

J. Chu–Carroll and M.K. Brown, "Initiative in Collaborative Interactions—Its Cues and Effects," Working Notes of the AAAI–97 Spring Symposium on Computational Models for Mixed Initiative Interaction, pp. 16–22, Mar. 1997.

S. Whittaker and P. Stenton, "Cues and Control in Expert–Client Dialogues," Proc. of the 26th Annual Meeting of the Association for Computational Linguistics, pp. 123–130, 1988.

M. Walker and S. Whittaker, "Mixed–Initiative in Dialogue: An Investigation into Discourse Segmentation," Proc. of the 28th Annual Meeting of the Association for Computational Linguistics, pp. 70–78, 1990.

H. Kitano and C. Van Ess–Dykema, "Toward a Plan–Based Understanding Model for Mixed–Initiative Dialogues," Proc. of the 29th Annual Meeting of the Association for Computational Linguistics, pp. 25–32, 1991.

R.W. Smith and D.R. Hipp, "Spoken Natural Language Dialog Systems—A Practical Approach," Oxford University Press, pp. 68–73, 1994.

C.I. Guinn, "Mechanisms for Mixed–Initiative Human–Computer Collaborative Discourse," Proc. of the 34th Annual Meeting of the Association for Computational Linguistics, pp. 278–285, 1996.

J. Gordon and E.H. Shortliffe, "The Dempster–Shafer Theory of Evidence," in B. Buchanan and E. Shortliffe, editors, "Rule–Based Expert Systems: The MYCIN Experiments of the Stanford Heuristic Programming Project," Ch. 13, pp. 272–292, Addison–Wesley, 1984.

W.G. Cochran, "The Comparison of Percentages in Matched Samples," Biometrika, vol. 37, pp. 256–266, 1950.

(List continued on next page.)

*Primary Examiner*—Richemond Dorvil

[57] ABSTRACT

A processing system which acts as a participant in the collaborative dialogue is first trained using a training algorithm. The training algorithm computes, in conjunction with a current turn of the training dialogue, a task initiative index and a dialogue initiative index for a next turn of the dialogue, using cues observed during the current turn, probability assignments associated with the observed cues, and current values of the task initiative index and the dialogue initiative index. The algorithm then predicts a task initiative holder and a dialogue initiative holder for the next turn of the training dialogue, using the task initiative index and dialogue initiative index computed for the next turn. The probability assignments associated with the observed cues are adjusted if the predicted task and dialogue initiative holders do not agree with corresponding respective actual task and dialogue initiative holders for the next turn. The computing, predicting and adjusting operations are repeated for each of the turns of the training dialogue in order to determine appropriate probability assignments for a given set of cues. The processing system then uses the resulting probability assignments to predict initiative shifts in an actual dialogue in which the system acts as a participant.

36 Claims, 4 Drawing Sheets

OTHER PUBLICATIONS

M.A. Walker, "Redundancy in Collaborative Dialogue," Proc. of the 15th International Conference on Computational Linguistics, pp. 345–351, 1992.

J.F. Allen, "Discourse Structure in the TRAINS Project," DARPA Speech and Natural Language Workshop, Feb. 1991.

J. Carletta, "Assessing Agreement on Classification Tasks: The Kappa Statistic," Computational Linguistics, 22:249–254, 1996.

J. Chu–Carroll and S. Carberry, "A Plan–Based Model for Response Generation in Collaborative Task–Oriented Dialogues," Proc. of the 12th National Conference on Artificial Intelligence, pp. 799–805, 1994.

J. Chu–Carroll and S. Carberry, "Response Generation in Collaborative Negotiation," Proc. of the 33rd Annual Meeting of the Association for Computational Linguistics, pp. 136–143, 1995.

P.W. Jordan and B. Di Eugenio, "Control and Initiative in Collaborative Problem Solving Dialogues," Working Notes of the AAAI–97 Spring Symposium on Computational Models for Mixed Initiative Interaction, pp. 81–84, Mar. 1997.

L. Lambert and S. Carberry, "A Tripartite Plan–Based Model of Dialogue," Proc. of the 29th Annual Meeting of the Association for Computational Linguistics, pp. 47–54, 1991.

D.J. Litman and J.F. Allen, "A plan Recognition Model for Subdialogues in Conversations," Cognitive Science, 11: 163–200, 1987.

D.G. Novick and S. Sutton, "What is Mixed–Initiative Interaction?," Working Notes of the AAAI–97 Spring Symposium on Computational Models for Mixed Initiative Interaction, pp. 114–116, Mar. 1997.

L.A. Ramshaw, "A Three–Level Model for Plan Exploration," Proc. of the 29th Annual Meeting of the Association for Computational Linguistics, pp. 36–46, 1991.

S. Siegel and N.J. Castellan, Jr., "Nonparametric Statistics for the Behavioral Sciences,"McGraw–Hill, pp. 284–291, 1988.

A. Abella et al., "Development Principles for Dialog–Based Interfaces," in Proceedings of the ECAI96 Workshop on Dialog Processing in Spoken Language Systems, pp. 1–7, 1996.

J. Chu–Carroll et al., "A Plan–Based Model for Response Generation in Collaborative Task–Oriented Dialogues," in proceedings of the Twelfth National Conference on Artificial Intelligence, pp. 799–804, 1994.

A. Joshi et al., "Living Up to Expectations: Computing Expert Responses," in Proceedings of the Fourth National Conference on Artificial Intelligence, pp. 169–175, 1984.

A. Cawsey et al., "Revising Beliefs and Intentions: A Unified Framework for Agent Interaction," in Proceedings of the Ninth Biennial Conference of the Society for the Study of Artificial Intelligence and Simulation Behavior, pp. 130–139, 1993.

S.W. McRoy et al., "The Repair of Speech Act Misunderstandings by Abductive Inference," Computational Linguistics 21(4), pp. 435–478, 1995.

M.E. Pollack, "A Model of Plan Inference that Distinguishes Between the Beliefs of Actors and Observers," in Proceedings of the 24th Annual Meeting of the Association for Computational Linguistics, pp. 207–214, 1986.

B. Raskutti et al., "Eliciting Additional Information During Cooperative Consultations," in Proceedings of the 15th Annual Meeting of the Cognitive Science Society, 1993.

D.R. Traum et al., "Miscommunication in Multi–modal Collaboration," in Proceedings of the AAAI–96 Workshop on Detecting, Repairing and Preventing Human–Machine Miscommunication, 1996.

P. van Beek et al., "From Plan Critiquing to Clarification Dialogue for Cooperative Response Generation," Computational Intelligence 9(2), pp. 132–154, 1993.

D.G. Bobrow et al., "GUS: A Frame Driven Dialog System," Artificial Intelligence, pp. 155–173, 1977.

S.J. Young et al., "The Design and Implementation of Dialogue Control in Voice Operated Database Inquiry Systems," Speech and Language, pp. 329–353, 1989.

S. Seneff, "TINA: A Natural Language System for Spoken Language Applications," Computational Linguistics, pp. 61–86, 1992.

TRACKING INITIATIVE IN COLLABORATIVE DIALOGUE INTERACTIONS

FIELD OF THE INVENTION

The present invention relates generally to dialogue processing systems, and more particularly to techniques for tracking initiative among multiple participants or agents in a collaborative dialogue processing system.

BACKGROUND OF THE INVENTION

Dialogue processing systems often utilize models of naturally-occurring collaborative dialogues to facilitate interaction between humans and computers. An important feature of such collaborative dialogue models is the initiative, which refers generally to a type of lead role which may be undertaken by a dialogue participant. Participants in a collaborative dialogue will also be referred to herein as agents. Initiative in a typical collaborative dialogue usually shifts among participants in a manner which is signaled by features such as linguistic cues and prosodic cues. In order for an automated dialogue processing system to interact with users in a natural and coherent manner, it must recognize the cues for initiative shifts from the users and provide appropriate cues in its responses to user utterances. Such dialogue processing systems are expected to come into increasingly widespread use in a variety of speech processing applications, including computer interfaces, automated call handlers, automatic teller machines (ATMs), reservation systems, interactive on-line services, and any other application involving human-machine interaction which can be characterized as a collaborative dialogue.

Conventional dialogue processing techniques which track initiative shifts in a collaborative dialogue are generally focused on tracking a single thread of control, typically the conversational lead, among the participants. Such techniques are described in, for example, S. Whittaker and P. Stenton, "Cues and Control in Expert-Client Dialogues," Proc. of the 26th Annual Meeting of the Association for Computational Linguistics, pp. 123–130, 1988, M. Walker and S. Whittaker, "Mixed-Initiative in Dialogue: An Investigation into Discourse Segmentation," Proc. of the 28th Annual Meeting of the Association for Computational Linguistics, pp. 70–78, 1990, H. Kitano and C. Van Ess-Dykema, "Toward a Plan-Based Understanding Model for Mixed-Initiative Dialogues," Proc. of the 29th Annual Meeting of the Association for Computational Linguistics, pp. 25–32, 1991; R. W. Smith and D. R. Hipp, "Spoken Natural Language Dialog Systems—A Practical Approach," Oxford University Press, 1994, and C. I. Guinn, "Mechanisms for Mixed-Initiative Human-Computer Collaborative Discourse," Proc. of the 34th Annual Meeting of the Association for Computational Linguistics, pp. 278–285, 1996, all of which are incorporated by reference herein.

A significant problem with these and other conventional initiative-tracking techniques is that merely maintaining the conversational lead is often insufficient for modeling the complex behavior commonly found in naturally-occurring collaborative dialogues. Consider the following example of a collaborative dialogue in which a number of alternative responses (3a)–(3c) may be given by an advisor A in response to a question from a student S:

(1) S: I want to take NLP to satisfy my seminar course requirement.
(2) S: Who is teaching NLP?
(3a) A: Dr. Smith is teaching NLP.
(3b) A: You can't take NLP because you haven't taken AI, which is a prerequisite for NLP.
(3c) A: You can't take NLP because you haven't taken AI, which is a prerequisite for NLP. You should take distributed programming to satisfy your requirement, and sign up as a listener for NLP.

In response (3a), the advisor A directly responds to S's question, and the conversational lead therefore remains with S. In responses (3b) and (3c), A takes the lead by initiating a subdialogue to correct S's invalid proposal. However, the above-noted conventional collaborative dialogue models maintain only the conversational lead, and are therefore unable to distinguish between the different types of initiatives in responses (3b) and (3c). For example, in response (3c), A actively participates in the planning process by explicitly proposing alternative actions, whereas in (3b), A merely conveys the invalidity of S's proposal. This example illustrates that it is desirable to distinguish between task initiative, which tracks the lead in the development of a plan, and dialogue initiative, which tracks the lead in determining the current focus of the discourse. The distinction allows A's behavior to be explained from a response generation point of view: in (3b), A responds to S's proposal by merely taking over the dialogue initiative, i.e., informing S of the invalidity of the proposal, while in (3c), A responds by taking over both the task and dialogue initiatives, i.e., informing S of the invalidity and suggesting a possible remedy. A dialogue processing system configured using conventional initiative tracking is unable to recognize the distinction between task and dialogue initiative, and therefore also unable to determine under what circumstances to generate the different types of responses represented by (3b) and (3c) above.

In general, a given agent is said to have the task initiative if that agent is directing how any agent's task should be accomplished, i.e., if the given agent's utterances directly propose actions that an agent should perform. The utterances may propose domain actions that directly contribute to achieving an agent's goal, such as "Let's send engine E2 to Corning." On the other hand, the given agent may propose problem-solving actions that do not contribute directly to an agent's goal, but instead to how an agent would go about achieving this goal, such as "Let's look at the first problem first." An agent is said to have the dialogue initiative if that agent takes the conversational lead in order to establish mutual beliefs between themselves and another agent, such as mutual beliefs about a piece of domain knowledge or about the validity of a proposal. For instance, in responding to a proposal from an agent proposing to send a boxcar to Coming via Dansville, another agent may take over the dialogue initiative, but not the task initiative, by saying "We can't go by Dansville because we've got Engine 1 going on that track." Thus, when an agent takes over the task initiative, that agent also takes over the dialogue initiative, since a proposal of actions can be viewed as an attempt to establish the mutual belief that a set of actions be adopted. On the other hand, an agent may take over the dialogue initiative but not the task initiative, as in response (3b) above. As noted previously, conventional techniques for tracking initiative in collaborative dialogues are unable to accommodate this important distinction.

It is therefore apparent that a need exists for dialogue processing techniques which are capable of differentiating and tracking the above-described task and dialogue initiatives in an efficient manner suitable for use in a variety of practical applications.

SUMMARY OF THE INVENTION

The present invention provides methods and apparatus for using a set of cues to track task and dialogue initiative in a collaborative dialogue. In an illustrative embodiment of the invention, a processing system which acts as a participant in a collaborative dialogue with a user is first trained using a training algorithm. During a current turn of a training dialogue, the training algorithm computes a task initiative index and a dialogue initiative index for the next turn of the training dialogue, using (i) cues observed during the current turn, (ii) probability assignments associated with the observed cues, and (iii) current or initial values of the task initiative index and the dialogue initiative index. Each of the probability assignments may be configured to assign a value in the range [0,1] to each of a number of possible initiative holders, such that the values for all the possible initiative holders sum to one, and the value assigned to a given initiative holder indicates the amount of support a corresponding cue provides for the given initiative holder actually holding the initiative in a dialogue.

The training algorithm then predicts a task initiative holder and a dialogue initiative holder for the next turn of the training dialogue, using the task initiative index and dialogue initiative index computed for the next turn. The probability assignments associated with the observed cues are adjusted if the predicted task and dialogue initiative holders do not agree with corresponding respective actual task and dialogue initiative holders for the next turn of the training dialogue. The computing, predicting and adjusting operations are repeated for each of the turns of the training dialogue in order to determine appropriate probability assignments for a given set of cues. The processing system may then use the resulting probability assignments in order to predict initiative shifts in an actual dialogue in which the system acts as a participant. Alternative embodiments of the invention may compute only a task initiative index or a dialogue initiative index, and use the result to predict only a task initiative holder or a dialogue initiative holder, respectively.

In accordance with another aspect of the invention, one of a number of different adjustment methods may be used to provide an adjustment in probability assignments in the above-described training algorithm. Each of the methods adjusts the probability assignments in favor of the actual initiative holder, and varies the effect that a disagreement between the actual and predicted initiative holders will have on changing the probability assignments for the observed cues. The first method is a constant-increment method in which each time a disagreement occurs, the value for the actual initiative holder in the probability assignment is incremented by a constant $\Delta$, while the value for another possible initiative holder is decremented by $\Delta$. The second method, a constant-increment-with-counter method, associates with each probability assignment for each cue a counter which is incremented when a correct prediction is made, and decremented when an incorrect prediction is made. If the counter for a given cue is negative, the above-described constant-increment method is invoked, and the counter is reset to zero. This second method ensures that a probability assignment will only be adjusted if it has no "credit" for previous correct predictions. The third illustrative method, a variable-increment-with-counter method, is a variation of the above-described constant-increment-with-counter method. In this third method, instead of determining whether an adjustment is needed, the counter value determines the amount by which a given probability assignment is to be adjusted. For example, the method may be configured such that each time the processing system makes an incorrect prediction, the value for the actual initiative holder is incremented by $\Delta/2^{count+1}$, and the value for another possible initiative holder is decremented by the same amount. Further improvements may be obtained for a given one of the above-described adjustment methods by varying the increment constant $\Delta$.

Evaluation of the inventive initiative tracking techniques on a number of sample dialogues shows that the invention can consistently improve the accuracy in prediction of task and dialogue initiative holders by about 2–4 and 8–13 percentage points, respectively, in a variety of collaborative environments, as compared to a simple conventional prediction method without the use of cues. For example, the invention has been shown to predict the task and dialogue initiative holders with 99.1% and 87.2% accuracies, respectively, in a corpus of exemplary collaborative planning dialogues. As noted above, previous work on mixed-initiative dialogues focused on tracking only conversational lead among participants, and was therefore unable to distinguish between task initiative and dialogue initiative. The invention recognizes that tracking of task and dialogue initiative may be used to determine more effectively when and how an agent will address an issue. By appropriate processing of cues indicative of task and dialogue initiative shifts during dialogue interactions, a dialogue processing system in accordance with the invention is better able to determine the task and dialogue initiative holders for each turn of a dialogue and thus to tailor its response to user utterances accordingly. These and other features and advantages of the present invention will become more apparent from the accompanying drawings and the following detailed description.

DETAILED DESCRIPTION OF THE INVENTION

The present invention will be illustrated below in conjunction with an exemplary dialogue processing system. It should be understood, however, that the invention is not limited to use with any particular type of processing system. The disclosed techniques are suitable for use with a wide variety of other systems and in numerous alternative applications. The term "collaborative dialogue" as used herein refers generally to a conversation-like exchange involving two or more participants. An "agent" refers generally to a dialogue participant. The term "initiative" refers generally to a role which an agent can take on in a collaborative dialog. A "task initiative" refers to a role in which a given agent takes the lead in developing a plan for one or more agents taking part in the dialogue. A "dialogue initiative" refers to a role in which the given agent takes the lead in determining the current focus of a discourse. It should be noted that although the dialogue processing techniques of the present invention are readily applicable to dialogues involving more than two agents, the techniques will be described herein using primarily two-agent illustrations, in which one agent acts as a speaker and the other as a hearer in a given turn of a dialogue.

Figure 1:
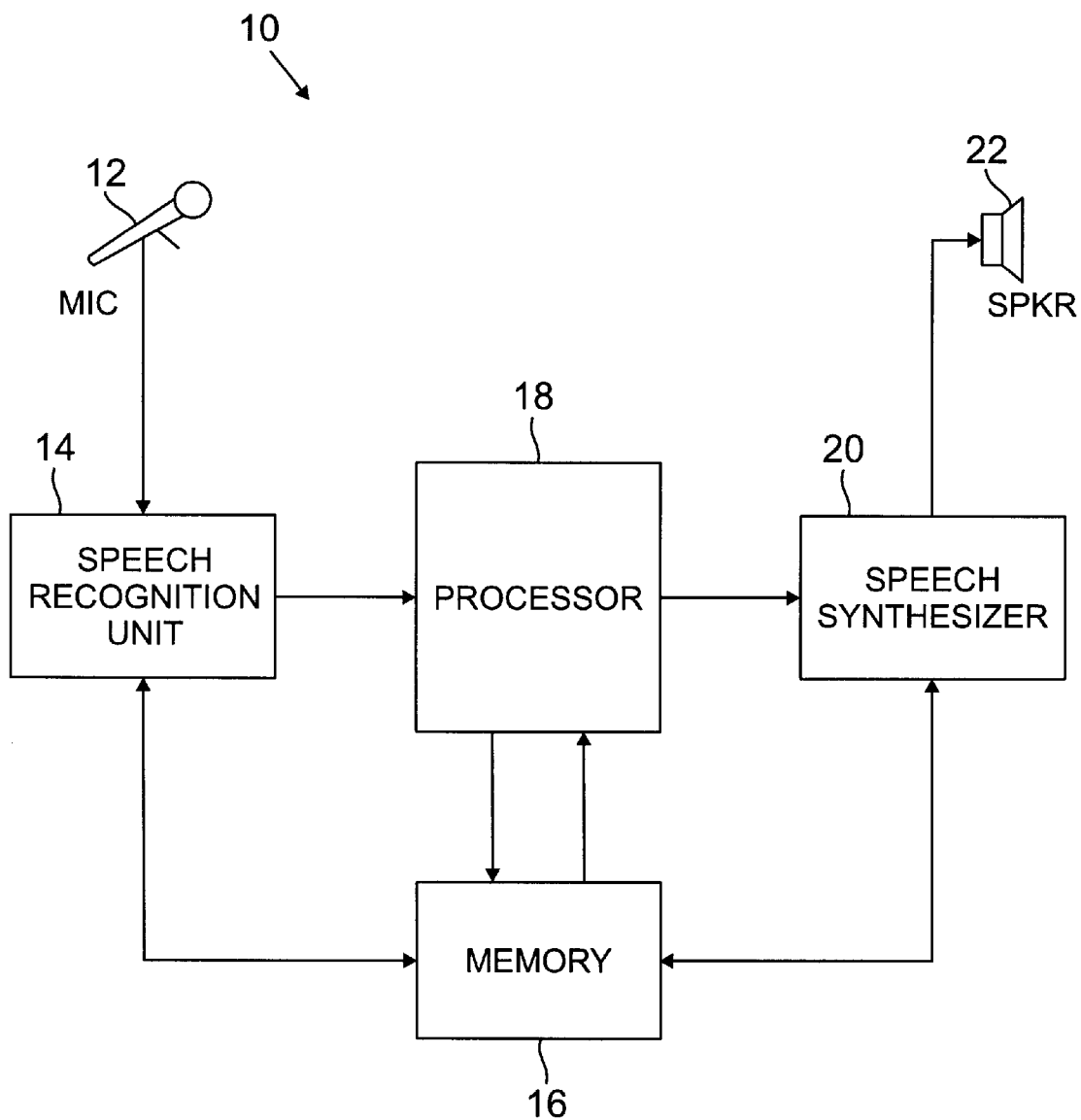
FIG. 1 shows an exemplary dialogue processing system in which the initiative tracking of the present invention may be incorporated.

FIG. 1 shows an exemplary dialogue processing system 10 in which initiative tracking techniques in accordance with the present invention may be implemented. The processing system 10 is configured to provide dialogue interaction between a computer or other processor and a human user. Both the computer and the human user are referred to herein as agents. The system 10 receives a speech signal in the form of utterances from the user via a microphone 12. A speech recognition unit 14 converts the speech signal to a computer-recognizable format, utilizing keyword templates or other information stored in a system memory 16. The converted speech signal is then supplied to a processor 18 for processing in accordance with dialogue processing techniques to be described in greater detail below. The processor 18 generates an output speech signal by supplying appropriate drive signals to a speech synthesizer 20. Both the processor 18 and the speech synthesizer 20 may make use of information stored in system memory 16. The output speech signal is supplied from speech synthesizer 20 to a speaker 22 for delivery in an audibly perceptible form to the user. The present invention may be implemented in the form of a computer software program stored in memory 16. The program may be executed by processor 18 in accordance with user-supplied input speech signals to produce a desired collaborative dialogue suitable for solving a particular problem in a given application. Although the system 10 of FIG. 1 is configured to process speech signals, alternative embodiments of the invention may utilize other types of input and output devices, such as a keyboard and a display monitor, respectively, to conduct a non-spoken dialogue with a user. In such embodiments, the user portion of the dialogue may be entered via the keyboard and the system responses may be displayed on the display monitor. The various elements of processing system 10 may represent hardware and/or software elements of a personal computer, mainframe computer, microcomputer, workstation, telephone call handling system, ATM or any other system in which human-machine interaction is implemented in the form of a collaborative dialogue. Furthermore, the system 10 may be used to process a dialogue involving more than a single human agent.

The present invention recognizes and makes use of the fact that task and dialogue initiatives shift between agents during the course of a dialogue. It is important for the agents to take into account signals for such initiative shifts for at least two reasons. First, recognizing and providing signals for initiative shifts allow the agents to better coordinate their actions, thus leading to more coherent and cooperative dialogues. Second, by determining whether or not it should hold the task and/or dialogue initiatives when responding to user utterances, a dialogue processing system is able to tailor its responses based on the distribution of initiatives. A dialogue processing system of the type shown in FIG. 1 above tracks initiative using cues identified from user utterances in a collaborative dialogue. The processing system models the collaborative dialogue by maintaining, for each agent participating in the dialogue, a task initiative index and a dialogue initiative index which measure the amount of evidence available to support that agent holding the task and dialogue initiatives, respectively. The dialogue is considered to be made up of a number of distinct turns, with each turn corresponding to an utterance or set of uninterrupted utterances from a given agent. After each turn in the dialogue, new initiative indices are calculated based on the current indices and the effects of the cues observed during the turn. These cues may be explicit requests by an agent to give up its initiative, or implicit cues such as ambiguous proposals. The new initiative indices then determine the initiative holders for the next turn of the dialogue, and the processing continues until the dialogue is complete.

The illustrative embodiment of the invention to be described in conjunction with FIG. 2 below makes use of the well-known Dempster-Shafer theory of evidence as an underlying model for inferring the accumulated effect of multiple cues on determining the initiative indices. The Dempster-Shafer theory is described in greater detail in, for example, Glenn Shafer, "A Mathematical Theory of Evidence, Princeton University Press, 1976, and J. Gordon and E. H. Shortliffe, "The Dempster-Shafer Theory of Evidence," in B. Buchanan and E. Shortliffe, editors, "Rule-Based Expert Systems: The MYCIN Experiments of the Stanford Heuristic Programming Project," Ch. 13, pp. 272–292, Addison-Wesley, 1984, both of which are incorporated by reference herein. The Dempster-Shafer theory is a mathematical theory for reasoning under uncertainty, which operates over a set of possible outcomes $\Theta$. Associated with each piece of evidence that may provide support for the possible outcomes is a basic probability assignment (bpa), which is a function that represents the impact of the piece of evidence on the different subsets of $\Theta$. A typical bpa assigns a number in the range [0,1] to each subset of $\Theta$ such that the numbers sum to 1. The number assigned to a given subset $\Theta_i$ denotes the amount of support the corresponding piece of evidence directly provides for the conclusions represented by subset $\Theta_i$. When multiple pieces of evidence are present, a combination rule is used to compute a new bpa from corresponding multiple individual bpas to represent the cumulative effect of the pieces of evidence.

The Dempster-Shafer theory is an appropriate basis for modeling collaborative dialogues for at least two reasons. First, unlike a Bayesian model, the Dempster-Shafer theory does not require a complete set of a priori and conditional probabilities, which may be difficult to obtain for sparse pieces of evidence. Second, the Dempster-Shafer theory distinguishes between situations in which no evidence is available to support any conclusion and those in which equal evidence is available to support each conclusion. Thus the outcome of the model more accurately represents the amount of evidence available to support a particular conclusion, or in other words, the provability of the conclusion.

A set of cues that provide evidence for initiative shifts will now be described. This exemplary set of cues permits the above-described Dempster-Shafer theory to be used as a basis for modeling initiative shifts in a collaborative dialogue. Conventional cues used to indicate shifts or lack of shifts in initiative, such as prompts and questions, are described in greater detail in the above-cited references S. Whittaker and P. Stenton, "Cues and Control in Expert-Client Dialogues," Proc. of the 26th Annual Meeting of the Association for Computational Linguistics, pp. 123–130, 1988, and M. Walker and S. Whittaker, "Mixed-Initiative in Dialogue: An Investigation into Discourse Segmentation," Proc. of the 28th Annual Meeting of the Association for Computational Linguistics, pp. 70–78, 1990. The present invention provides a substantial improvement over these and other conventional cue sets by identifying a number of additional cues that may contribute to the shift or lack of shift in task/dialogue initiatives during collaborative dialogue interactions. The exemplary embodiment of the invention described below uses a total of eight cue types, which are grouped into the classes, explicit, discourse and analytical, based on the kind of knowledge needed to recognize the cues. TABLE 1 below shows the three classes, the eight cue types and any subtypes, indicates whether a given cue type may affect merely the dialogue initiative (DI) or both the task initiative (TI) and the DI, and indicates for each cue type which agent, the speaker or hearer, is expected to hold the initiative in the next turn of the dialogue.

TABLE 1

Cues for Modeling Initiative

| Class | Cue Type | Subtype | Effect | Initiative | Example |
|---|---|---|---|---|---|
| Explicit | Explicit requests | give up | both | hearer | "Any suggestions?" "Summarize the plan up to this point." |
| | | take over | both | speaker | "Let me handle this one." |
| Discourse | End silence | | both | hearer | |
| | No new info | repetitions | both | hearer | A: "Grab the tanker, pick up oranges, go to Elmira, make them into orange juice." B: "We go to Elmira, we make orange juice, okay." |
| | | prompts | both | hearer | "Yeah," "Ok," "Right" |
| | Questions | domain | DI | speaker | "How far is it from Bath to Corning?" |
| | | evaluation | DI | hearer | "Can we do the route the banana guy isn't doing?" |
| | Obligation fulfilled | task | both | hearer | A: "Any suggestions?" B: "Well, there's a boxcar at Dansville." "But you have to change your banana plan." A: "How long is it from Dansville to Corning?" |
| | | discourse | DI | hearer | C: "Go ahead and fill up E1 with bananas." D: "Well, we have to get a boxcar." C: "Right, okay. It's shorter to Bath from Avon." |
| Analytical | Invalidity | action | both | hearer | A: "Let's get the tanker car to Elmira and fill it with OJ." B: "You need to get oranges to the OJ factory." |
| | | belief | DI | hearer | C: "It's shorter from Bath to Avon." D: "It's shorter to Dansville." "The map is slightly misleading." |
| | Suboptimality | | both | hearer | A: "Using Saudi on Thursday the eleventh." B: "It's sold out." A: "Is Friday open?" B: "Economy on Pan Am is open on Thursday." |
| | Ambiguity | action | both | hearer | A: "Take one of the engines from Corning." B: "Let's say engine E2." |
| | | belief | DI | hearer | C: "We would get back to Corning at four." D: "4 PM? 4 AM?" |

The exemplary set of cues shown in TABLE 1 are based on an analysis of the TRAINS91 dialogue described in D. Gross, J. F. Allen and D. R. Traum, "The TRAINS 91 Dialogues," Technical Report TN92-1, Department of Computer Science, University of Rochester, 1993, which is incorporated by reference herein. The dialogues were first annotated to include actual DI and TI holders for each turn, and then analyzed to identify cues which may have contributed to the shift or lack of shift in initiative during the interactions. A given agent was determined to hold the task initiative during a turn as long as some utterance from that agent during the turn directly proposes how at least one agent should accomplish its goal. TABLE 2 below shows the distribution of task and dialogue initiatives between a system agent and manager agent in the TRAINS91 dialogues. TABLE 2 indicates that while the task and dialogue initiatives are held by the same agent in the majority of turns, in approximately one-fourth of the turns, the agents' behavior can be better accounted for by tracking the two types of initiatives separately. It should be noted that the TRAINS91 dialogues are used herein for illustration purposes only, and should not be construed as indicative of typical collaborative dialogues. The present invention may be used with a wide variety of other types of collaborative dialogues.

TABLE 2

Distribution of Task and Dialogue Initiatives in TRAINS 91 Dialogues

| | TI:System | TI:Manager |
|---|---|---|
| DI: System | 37 (3.5%) | 274 (26.3%) |
| DI: Manager | 4 (0.4%) | 727 (69.8%) |

Referring again to TABLE 1, the first of the three cue classes identified therein, explicit cues, includes explicit requests by the speaker to give up or take over the initiative. For instance, the utterance "Any suggestions?" indicates that the speaker intends the hearer to take over both the task and dialogue initiatives. Such explicit cues can be recognized by inferring the discourse and/or problem-solving intentions conveyed by the speaker's utterances.

The second of the three cue classes in TABLE 1, discourse cues, includes cues that can be recognized using linguistic and discourse information, such as from the surface form of an utterance, or from the discourse relationship between the current and prior utterances. The discourse class includes four cue types. The first cue type is perceptible silence at the end of an utterance, which suggests that the speaker has nothing more to say and may intend to give up the initiative. The second type of discourse cue includes utterances that do not contribute information that has not been conveyed earlier in the dialogue. This type of cue can be further classified into two subtypes: repetitions, in which the speaker paraphrases an utterance by the hearer or repeats the utterance verbatim, and prompts, in which the speaker merely acknowledges the hearer's previous utterance(s). Repetitions and prompts also suggest that the speaker has nothing more to say and therefore indicate that the hearer should take over the initiative. The third type of discourse cue includes questions which, based on anticipated responses, are divided into domain and evaluation questions. Domain questions are questions in which the speaker intends to obtain or verify a piece of domain knowledge. Such questions usually require a direct response and thus typically do not result in an initiative shift. Evaluation questions, on the other hand, are questions in which the speaker intends to assess the quality of a proposed plan. These questions often require an analysis of the proposal, and thus frequently result in a shift in dialogue initiative. The final type of discourse cue includes utterances that fulfill an outstanding task or discourse obligation. Such obligations may have resulted from a prior request by the hearer, or from an interruption initiated by the speaker. In either case, when the task/dialogue obligation is fulfilled, the initiative may be reverted back to the hearer who held the initiative prior to the request or interruption.

The third cue class in TABLE 1, analytical cues, includes cues that cannot be recognized without the hearer performing an evaluation of the speaker's proposal using the hearer's private knowledge. After the evaluation, the hearer may find the proposal invalid, suboptimal, or ambiguous. As a result, the hearer may initiate a subdialogue to resolve the problem, resulting in a shift in the task/dialogue initiatives.

Figure 2:
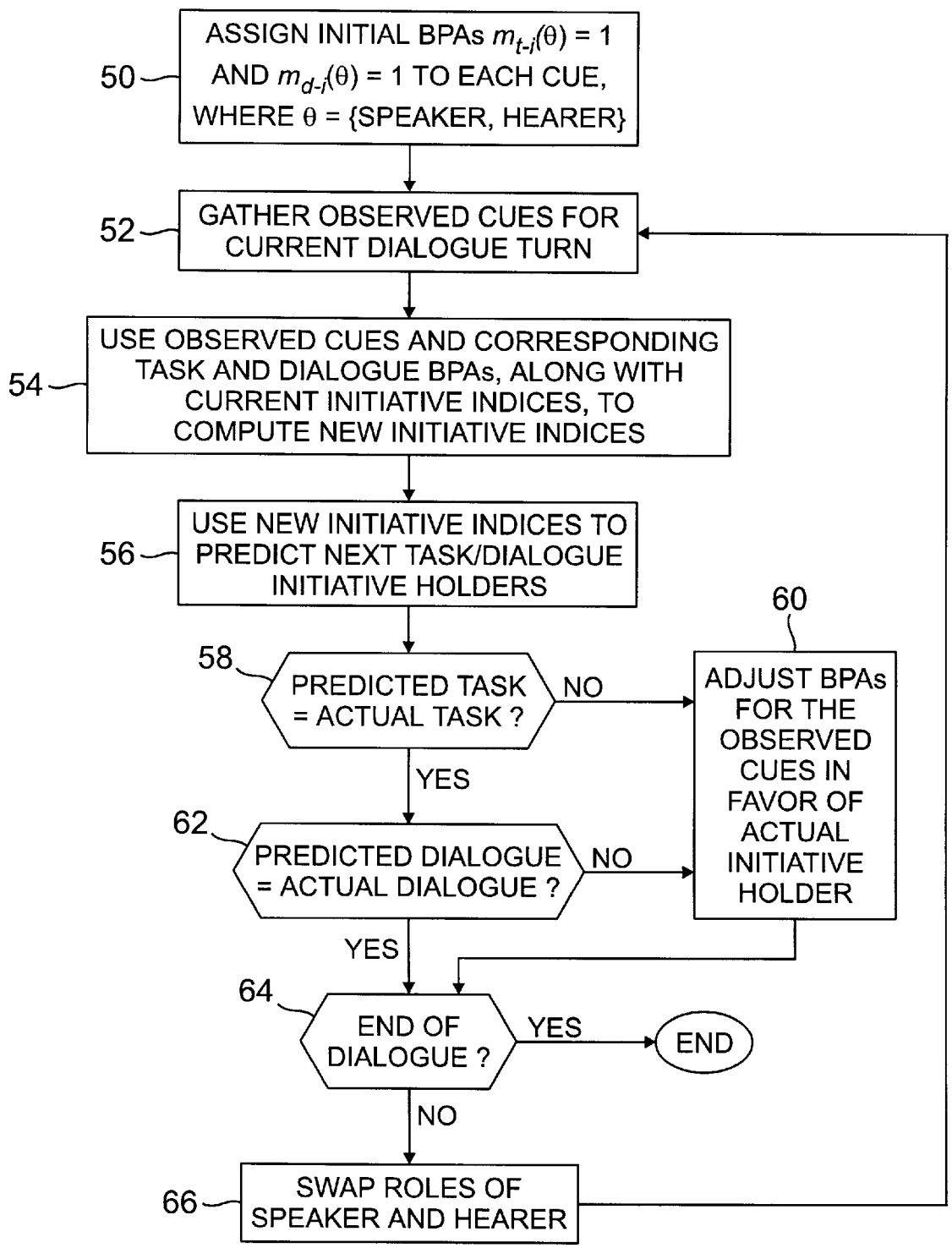
FIG. 2 shows a flow chart illustrating an initiative tracking process in accordance with an illustrative embodiment of the invention.

FIG. 2 is a flow diagram illustrating an exemplary process which may be used to train a dialogue processing system to provide initiative tracking in accordance with the invention. The exemplary process makes use of the above-described Dempster-Shafer theory, and is applied to a training dialogue which is annotated to indicate actual task initiative and dialogue initiative holders. The process is configured such that, at the end of each turn in a given dialogue, new task initiative and dialogue initiative indices for the next turn are computed based on the indices for the current turn and the effect of the cues observed in the current turn, in order to predict the task and dialogue initiative holders for the next turn. The initiative indices for the current turn and next turn of a dialogue are represented in this illustrative embodiment as bpas. The task initiative indices for the current turn are designated $m_{t-cur}$(speaker) $m_{t-cur}$(hearer), while the task initiative indices for the next turn are designated $m_{t-next}$(speaker) and $m_{t-next}$(hearer). Similarly, the dialogue initiative indices for the current turn are designated $m_{d-cur}$(speaker) and $m_{d-cur}$(hearer), while the dialogue initiative indices for the next turn are designated $m_{d-next}$(speaker) and $m_{d-next}$(hearer). The exemplary process computes new task and dialogue bpas $m_{t-next}$ and $m_{d-next}$ or for speaker and hearer agents in each turn of a dialogue by applying the above-noted combination rule to the current bpas representing the current initiative indices and the bpa of each observed cue. It has been determined that some cues provide stronger evidence for an initiative shift than others. Furthermore, a given cue may provide stronger support for a shift in dialogue initiative than in task initiative. Thus, this embodiment of the invention associates two bpas with each cue in order to represent the effect of the cue on changing the current task and dialogue initiative indices, respectively. Although illustrated for a two-agent dialogue, it will be readily apparent to those skilled in the art that the algorithm can be extended in a straightforward manner to be used to process dialogues involving a larger number of agents.

The FIG. 2 process represents a training algorithm, which is referred to as Train-bpa and will be further illustrated in pseudocode below. In step 50 of FIG. 2, each cue is assigned the default bpas $m_{t-i}(\Theta)=1$ and $m_{d-i}(\Theta)=1$, where the set $\Theta=\{speaker, hearer\}$. In other words, it is initially assumed that each cue has no effect on changing the current initiative indices. Steps 52 through 66 of FIG. 2 are then applied to each turn of the annotated dialogue data to obtain the final bpas for each cue. Step 52 gathers the observed cues for the current turn of the dialogue. Step 54 uses the observed cues and the task and dialogue bpas for each observed cue, along with the current initiative indices, to compute new initiative indices for the next turn of the dialogue. This step utilizes the above-described combination rule to combine pairs of bpas until a final bpa is obtained to represent the cumulative effect of the given bpas. The resulting bpas are then used in step 56 to predict the task and dialogue initiative holders for the next turn of the dialogue. The pseudocode given below illustrates one technique for predicting the task and dialogue initiative holders for the next turn.

In steps 58 and 62, determinations are made as to whether the respective predicted task and dialogue holders differ from the actual holders in the training dialogue. If the predicted holder is determined to differ from the actual holder in either step 58 or step 62, the bpas for the observed cues are adjusted in favor of the actual initiative holder as shown in step 60. This adjustment may be carried out using a function adjust-bpa to be described in greater detail below. If both the predicted task initiative holder and predicted dialogue initiative holder equal their respective actual initiative holders, or alternatively after the appropriate bpas have been adjusted in step 60, a determination is made in step 64 as to whether the dialogue has ended. If the dialogue has ended, the training process for that dialogue ends. If the dialogue has not ended, the training process swaps the roles of the speaker and hearer in step 66, and returns to step 52 to process the next turn in the dialogue. A dialogue processing system such as that shown in FIG. 1 may be trained using the training algorithm of FIG. 2 such that it is thereafter better able to recognize and process initiative shifts in actual dialogues.

The following pseudocode illustrates the exemplary training algorithm of FIG. 2 in greater detail.

```
Train-bpa (annotated-data)
1. /* initialize algorithm */
        m_t-cur ← default TI indices
        m_d-cur ← default DI indices
        current-data ← read (annotated-data)
        cue-set ← cues in current-data /* cues observed in current
        turn */
2. /* compute new initiative indices for next turn */
        m_t-obs ← TI bpas for cues in cue set
        m_d-obs ← DI bpas for cues in cue set
        m_t-next ← combine (m_t-cur, m_t-obs)
        m_d-next ← combine (m_d-cur, m_d-obs)
3. /* predict initiative holders for next turn */
        If m_t-next (speaker) ≥ m_d-next (hearer), predicted-task ← speaker
        Else, predicted-task ← hearer
        If m_d-next (speaker) ≥ m_d-next (hearer), predicted-
        dialogue ← speaker
        Else, predicted-dialogue ← hearer
4. /* find actual initiative holders for next turn and compare with
predictions */
        new-data ← read (annotated-data)
        actual-task ← actual TI holder in new-data /* actual holder for
        next turn */
        actual-dialogue ← actual DI holder in new-data
        If predicted-task ≠ actual-task,
                adjust-bpa (cue-set, task)
                reset-current-bpa (m_t-cur)
        If predicted-dialogue ≠ actual-dialogue,
                adjust-bpa (cue-set, dialogue)
                reset-current-bpa (m_d-cur)
5. If end-of-dialogue, return
   Else, /* swap roles of speaker and hearer */
        m_t-cur (speaker) ← m_t-next (hearer)
        m_d-cur (speaker) ← m_d-next (hearer)
        m_t-cur (hearer) ← m_t-next (speaker)
        m_d-cur (hearer) m_d-next (speaker)
        cue-set ← cues in new-data
        Go to Step 2
```

The adjust-bpa function in the above pseudocode adjusts the bpas for the observed cues in favor of the actual initiative holder, while the reset-current-bpa function is invoked to adjust the current bpas for the initiative indices to reflect the actual initiative holder. Three illustrative adjustment methods for use in the adjust-bpa function will now be described, each varying the effect that a disagreement between the actual and predicted initiative holders will have on changing the bpas for the observed cues. The first method is a constant-increment method in which each time a disagreement occurs, the value for the actual initiative holder in the bpa is incremented by a constant $\Delta$, while the value for the other initiative holder in $\Theta$ is decremented by $\Delta$. The second method, a constant-increment-with-counter method, associates with each bpa for each cue a counter which is incremented when a correct prediction is made, and decremented when an incorrect prediction is made. The counters may be implemented in software running the training algorithm and executed by processor 18 of FIG. 1. If the counter for a given cue is negative, the above-described constant-increment method is invoked, and the counter is reset to 0. This second method ensures that a bpa will only be adjusted if it has no "credit" for previous correct predictions. The third illustrative method, a variable-increment-with-counter method, is a variation of the above-described constant-increment-with-counter method. In this third method, instead of determining whether an adjustment is needed, the counter value determines the amount by which a given bpa is to be adjusted. For example, the method may be configured such that each time the processing system makes an incorrect prediction, the value for the actual initiative holder is incremented by $\Delta/2^{count+1}$, and the value for the other possible initiative holder in $\Theta$ is decremented by the same amount. Other methods may also be used to provide adjustment of bpas in the exemplary training algorithm of FIG. 2. As will be shown below, further improvements may be obtained for a given one of the above-described adjustment methods by varying the increment constant $\Delta$.

Figure 3:
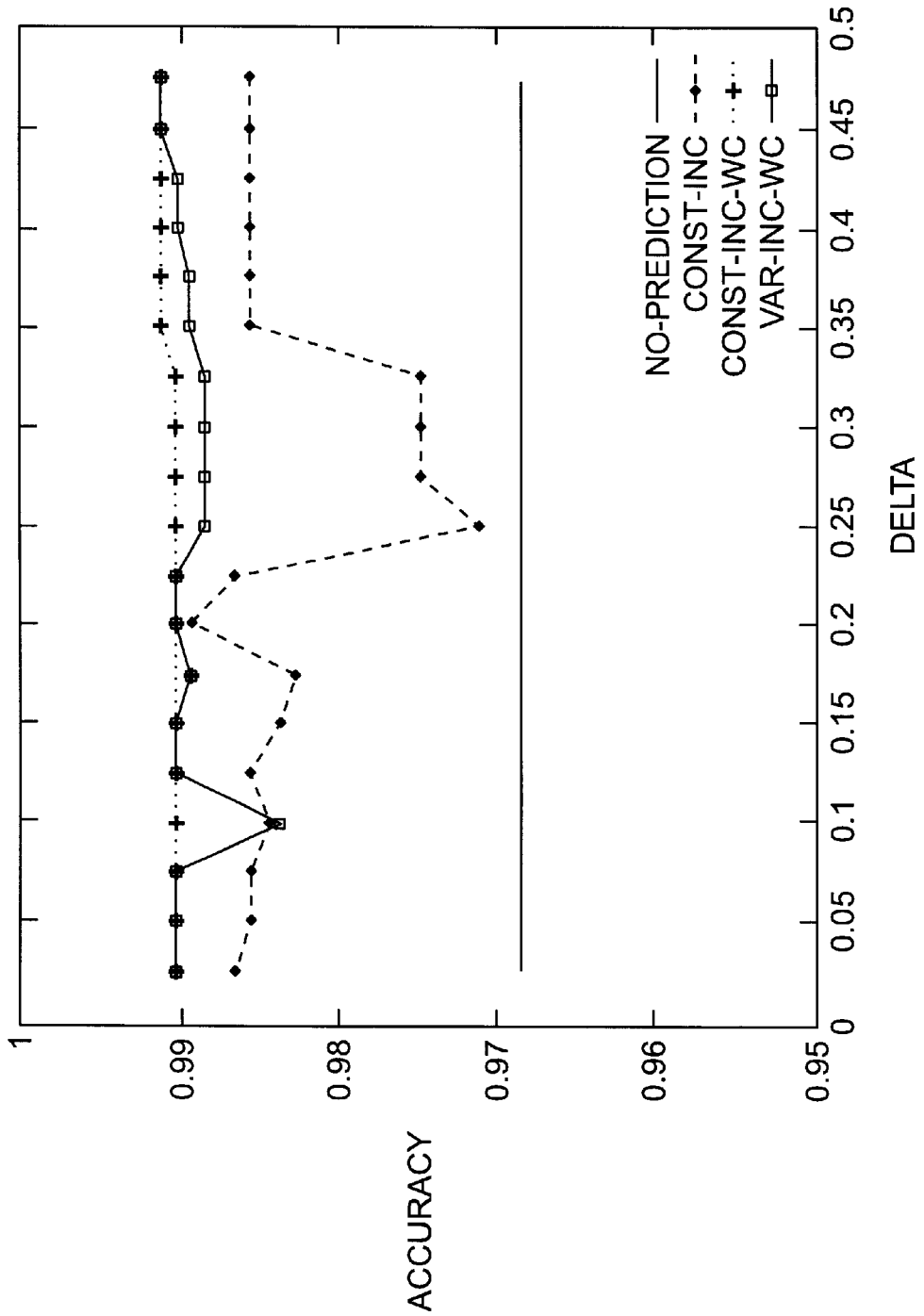
FIGS. 3 and 4 show a number of plots illustrating the performance of an initiative tracking process in accordance with the present invention.
Figure 4:
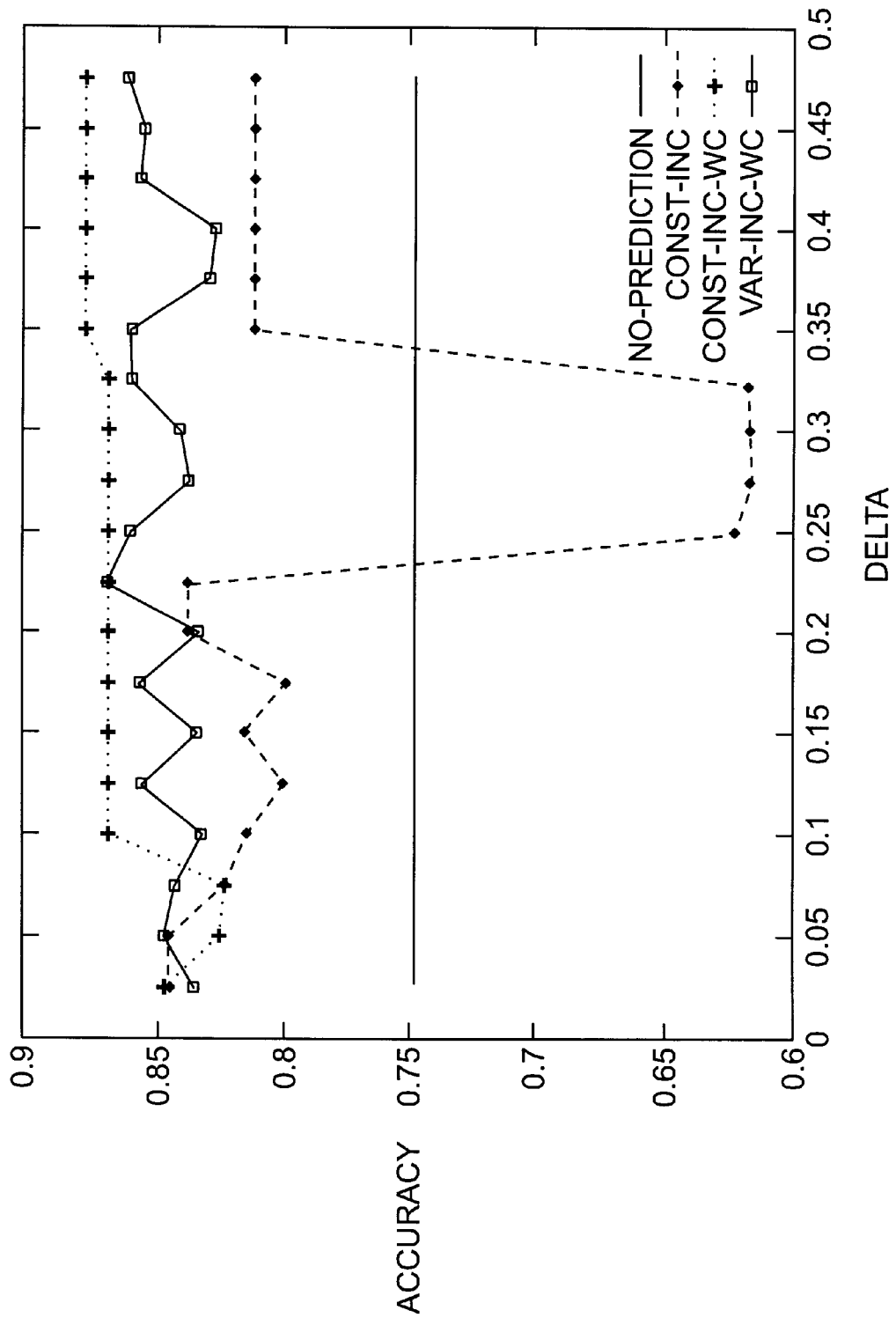

FIGS. 3 and 4 show the performance of an exemplary dialogue processing system in predicting the task and dialogue initiative holders, respectively, using each of the three bpa adjustment methods described above. For comparison purposes, the straight lines in FIGS. 3 and 4 show the system performance without the use of cues, that is, always predicting that the initiative remains with the current holder. For each adjustment method, nineteen different training sessions were run with $\Delta$ values ranging from 0.025 to 0.475, incremented by 0.025 between each session. The processing system was evaluated for its accuracy in predicting the task and dialogue initiative holders for each turn of the above-noted TRAINS91 dialogues. The TRAINS91 dialogues were first divided into eight dialogue sets based on speaker/hearer pairs. For each value of $\Delta$, the measurement results were cross-validated by applying the FIG. 2 training algorithm to seven of the eight dialogue sets and then testing the resulting bpas on the remaining set.

FIGS. 3 and 4 indicate that in the vast majority of cases, the prediction methods of the present invention yield better results than making predictions without cues. Furthermore, substantial additional improvement is gained by the above-described use of counters in the second and third methods in that the counters may be used to prevent the effect of "exceptions of the rules" from accumulating and resulting in erroneous predictions, where "exceptions of the rules" refer to cases in which the initiative shift differs from that predicted by the cues in TABLE 1. By restricting the increment to be inversely exponentially related to the "credit" a given bpa had in making correct predictions, the variable-increment-with-counter method in this example obtains better and more consistent results than the constant-increment method. However, the "exceptions of the rules" produced some undesirable effects in the variable-increment-with-counter method, and thus the best performance was provided in this example by the constant-increment-with-counter method. The relative results of the different adjustment methods may be expected to vary depending on the particular dialogues used in the training algorithm.

TABLES 3A and 3B below show the results of an analysis of cases in which the dialogue processing system made erroneous predictions, using the constant-increment-with-counter adjustment method with a $\Delta$ value of 0.35. This was the $\Delta$ value found to yield the optimal results in FIGS. 3 and 4. TABLES 3A and 3B summarize the results of the analysis with respect to task initiatives and dialogue initiatives, respectively. For each cue type, the prediction errors are grouped based on whether or not a shift occurred in the actual dialogue. For example, the first row in TABLE 3A shows that when the invalidity cue is detected, the system failed to predict a task initiative shift in 2 out of 3 cases. On the other hand, it correctly predicted all 11 cases where no shift in task initiative occurred. TABLE 3A also shows that when an analytical cue, such as invalidity, suboptimality or ambiguity, is detected, the system correctly predicted all but one case in which there was no shift in task initiative. However, 55% of the time, the system failed to predict a shift in task initiative. In the case of suboptimal actions, a sparse data problem contributed to the prediction errors. Since there is only one instance of this particular cue in the above-described set of TRAINS91 dialogues, when the cue is present in a testing set, it is absent from the training set. The result in TABLE 3A indicates that it may be beneficial to take other features into account when evaluating user proposals in order to more accurately model initiative shifts resulting from such cues. Similar observations can be made about the errors in predicting dialogue initiative shifts when analytical cues are observed, as shown in TABLE 3B.

TABLE 3A

Task Initiative Errors

| Cue Type | Subtype | Shift | | No-Shift | |
| --- | --- | --- | --- | --- | --- |
| | | error | total | error | total |
| Invalidity | action | 2 | 3 | 0 | 11 |
| Suboptimality | | 1 | 1 | 0 | 0 |
| Ambiguity | action | 3 | 7 | 1 | 5 |

TABLE 3B

Dialogue Initiative Errors

| Cue Type | Subtype | Shift | | No-Shift | |
| --- | --- | --- | --- | --- | --- |
| | | error | total | error | total |
| End silence | | 13 | 41 | 0 | 53 |
| No new info | prompts | 7 | 193 | 1 | 6 |
| Questions | domain | 13 | 31 | 0 | 98 |
| | evaluation | 8 | 28 | 5 | 7 |
| Obligation fulfilled | discourse | 12 | 198 | 1 | 5 |
| Invalidity | | 11 | 34 | 0 | 0 |
| Suboptimality | | 1 | 1 | 0 | 0 |
| Ambiguity | | 9 | 24 | 0 | 0 |

TABLE 3B indicates that when a perceptible silence is detected at the end of an utterance, when the speaker titters a prompt, or when an outstanding discourse obligation is fulfilled, the system correctly predicted the dialogue initiative holder in the vast majority of cases. However, for the cue class "questions," when the actual initiative shift differs from the norm, that is, speaker retaining initiative for evaluation questions and hearer taking over initiative for domain questions, the system's performance worsens. In the case of domain questions, errors occur when (1) the response requires more reasoning than do typical domain questions, causing the hearer to take over the dialogue initiative, or (2) the hearer, instead of merely responding to the question, offers additional helpful information. In the case of evaluation questions, errors occur when (1) the result of the evaluation is readily available to the hearer, thus eliminating the need for an initiative shift, or (2) the hearer provides extra information. Although it is difficult to predict when an agent may include extra information in response to a question, taking into account the cognitive load that a question places on the hearer may allow more accurate prediction of dialogue initiative shifts.

The above-described initiative tracking techniques are applicable to a wide variety of other dialogue processing environments. In order to illustrate the generality of the invention, the above-described illustrative training algorithm was applied, using the constant-increment-with-counter (CIWC) adjustment method and a Δ value of 0.35, to the TRAINS91 dialogues in order to obtain a set of bpas. The resulting trained processing system was then evaluated on subsets of four different types of dialogues: (1) the TRAINS93 dialogues described in P. A. Heeman and J. F. Allen, "The TRAINS93 Dialogues," Technical Report TN94-2, Department of Computer Science, University of Rochester, 1995, which is incorporated by reference herein, (2) airline reservation dialogues from transcripts of actual audiotaped conversations made at SRI International, Menlo Park, Calif., 1992, and prepared by J. Kowtko under the direction of P. Price, (3) maptask instruction-giving dialogues from transcripts of a Sleep Deprivation Study conducted by Defense and Civil Institute of Environmental Medicine (DCIEM), Canada, and Human Communication Research Centre (HCRC), University of Edinburgh and University of Glasgow, UK, 1996, distributed by HCRC and the Linguistics Data Consortium (LDC) at University of Pennsylvania, and (4) non-task oriented dialogues from transcripts of switchboard telephone conversations on the topic of credit card use, collected at Texas Instruments, 1992, produced by NIST and available through LDC. Each of these four different types of dialogues represents a different potential application environment. TABLE 4 below shows the results of the evaluation of the four dialogues listed above and the previous cross-validated results on the TRAINS91 dialogues, compared with baseline predictions without the use of cues.

TABLE 4

System Performance Across Different Application Environments

| Dialogue (Turns) | TRAINS91 (1042) | | TRAINS93 (256) | | Airline (332) | | Maptask (320) | | Switchboard (282) | |
|---|---|---|---|---|---|---|---|---|---|---|
| | T | D | T | D | T | D | T | D | T | D |
| Expert Control | 41 | 311 | 37 | 101 | 194 | 193 | 320 | 277 | N/A | 166 |
| | 3.9% | 29.8% | 14.4% | 39.5% | 58.4% | 58.1% | 100% | 86.6% | | 59.9% |
| No cue | 1009 | 780 | 239 | 189 | 308 | 247 | 320 | 270 | N/A | 193 |
| | 96.8% | 74.9% | 93.3% | 73.8% | 92.8% | 74.4% | 100% | 84.4% | | 68.4% |
| CIWC | 1033 | 915 | 250 | 217 | 316 | 281 | 320 | 297 | N/A | 216 |
| | 99.1% | 87.8% | 97.7% | 84.8% | 95.2% | 84.6% | 100% | 92.8% | | 76.6% |
| Improvement | 2.3% | 12.9% | 4.4% | 11.0% | 2.4% | 10.2% | 0.0% | 8.4% | N/A | 8.2% |

The first row of data in TABLE 4 indicates the number of turns in the dialogue for each of the different dialogues. An expert agent was designated for each of the dialogues, as follows: for the TRAINS91 and TRAINS93 dialogues, the processing system; in the airline dialogues, the travel agent; in the maptask dialogues, the instruction giver; and in the switchboard dialogues, the agent who holds the dialogue initiative the majority of the time. Percentage figures given in the second row of TABLE 4 indicate the percentage of time the task (T) and dialogue (D) initiatives remain with the designated expert agent. This analysis shows that the distribution of initiatives varies quite significantly across different types of dialogues, with the distribution biased toward one agent in the TRAINS91, TRAINS93 and maptask dialogues, and split fairly evenly in the airline and switchboard dialogues. The third row of TABLE 4 shows the results of applying the baseline prediction method to the various dialogues, in terms of percentage of correct predictions. The fourth row in TABLE 4 shows the prediction results when applying the training algorithm of FIG. 2 using the CIWC adjustment method. Finally, the fifth row of TABLE 4 shows the improvement in percentage points between initiative prediction using the present invention over the baseline prediction method.

The statistical significance of the differences between the results obtained by use of the invention and the results obtained using conventional prediction without cues was tested for each of the exemplary dialogues of TABLE 4 by applying Cochran's Q test to the results in the third and fourth rows. Cochran's Q test is described in greater detail in W. G. Cochran, "The Comparison of Percentages in Matched Samples," Biometrika, Vol. 37, pp. 256–266, 1950, which is incorporated by reference herein. The tests show that for all of the exemplary dialogues, the differences between the two algorithms when predicting the task and dialogue initiative holders are statistically significant at levels on the order of $p<0.05$ and $p<10^{-5}$, respectively.

Based on the results of the multiple application environment evaluations summarized in TABLE 4, the following general observations can be made. First, TABLE 4 illustrates the generality of the initiative tracking techniques of the present invention. Although the performance of the dialogue processing system varies across the different environments, the use of cues in accordance with the invention consistently improves accuracy in predicting the task and dialogue initiative holders by about 2–4 percentage points and 8–13 percentage points, respectively. The exception is the maptask domain, in which there is no significant room for improvement because the task initiative remains with one agent, the instruction giver, throughout the dialogue. Second, TABLE 4 shows the specificity of the trained bpas with respect to different application environments. Using the initiative tracking mechanism of the invention, the system performance on the collaborative planning dialogues, such as TRAINS91, TRAINS93, and airline, most closely resemble one another, as shown in the fourth row of TABLE 4. This indicates that the bpas may be somewhat sensitive to application environments since these values may affect how agents interpret cues. Third, the initiative tracking of the present invention yields substantial improvements on task-oriented dialogues. This is because such dialogues are generally constrained by a set of goals, and therefore include fewer digressions and offers of unsolicited opinion as compared to, for example, the switchboard dialogues.

The present invention thus provides techniques for tracking task and dialogue initiatives between participants in mixed-initiative dialogue interactions. The invention distinguishes between task and dialogue initiatives, and is able to model phenomena in collaborative dialogues that conventional systems are unable to account for. An exemplary set of eight different types of cues that affect initiative shifts in dialogues was presented, and it was demonstrated how the tracking techniques of the invention predict initiative shifts based on the current initiative holders and the effects that observed cues have on changing the current initiative holders. The above-described experimental results show that by utilizing the constant-increment-with-counter adjustment method in determining the basic probability assignments for each cue, the system can correctly predict the task and dialogue initiative holders 99.1% and 87.8% of the time, respectively, in the exemplary TRAINS91 dialogues, compared to 96.8% and 74.9% without the use of cues. The differences between these results were shown to be statistically significant. In addition, the generality of the initiative tracking techniques of the invention was demonstrated by applying it to dialogues in different application environments. The results indicate that although the basic probability assignments may be sensitive to application environments, the use of cues in the initiative prediction process significantly improves system performance.

The above-described embodiments of the invention are intended to be illustrative only. Numerous alternative embodiments may be devised by those skilled in the art without departing from the scope of the following claims.

What is claimed is:

1. A method for use in a processing system for tracking shifts in initiative during a dialogue, the dialogue including a sequence of turns, the method comprising the steps of:

receiving an input signal representing one of speech and text associated with at least a portion of the dialogue;

predicting in conjunction with a current turn of the dialogue, associated with the received input signal, at least one of a task initiative holder and a dialogue initiative holder for a next turn of the dialogue, using at least one cue observed during the current turn, and a probability assignment associated with the observed cue;

adjusting the probability assignment associated with the observed cue if at least one of the predicted task initiative holder and predicted dialogue initiative holder do not agree with corresponding respective actual task and dialogue initiative holders for the next turn of the dialogue; and storing the probability assignment in the form of a signal for subsequent use in predicting initiative shifts in another dialogue.

2. The method of claim 1 further including the step of computing in conjunction with the current turn of the dialogue at least one of a task initiative index and a dialogue initiative index for the next turn of the dialogue, using (i) the at least one cue observed during the current turn, (ii) the probability assignment associated with the observed cue, and (iii) a current value of at least one of the task initiative index and the dialogue initiative index, and wherein the predicting step includes predicting at least one of the task initiative holder and the dialogue initiative holder for the next turn of the dialogue, using at least one of the task initiative index and dialogue initiative index computed for the next turn.

3. The method of claim 2 wherein the current value of at least one of the task initiative index and the dialogue initiative index includes initial values of the task initiative index and the dialogue initiative index assigned prior to performing the computing, predicting and adjusting steps for a first turn of the dialogue.

4. The method of claim 1 wherein each of the probability assignments assigns a value in the range (0,1) to each of a plurality of possible initiative holders, such that the values for all the possible initiative holders sum to 1, and the value assigned to a given initiative holder indicates the amount of support a corresponding cue provides for the given initiative holder actually holding the initiative in the dialogue.

5. The method of claim 1 further including the step of repeating the predicting and adjusting steps for each of a plurality of turns of the dialogue, while swapping roles of speaker and hearer for each turn.

6. The method of claim 1 further including performing the predicting and adjusting steps for each of a plurality of turns of a first dialogue in order to determine appropriate probability assignments for a given set of cues, and using the resulting probability assignments to predict initiative shifts in a second dialogue.

7. The method of claim 1 wherein the adjusting step adjusts the probability assignment associated with a given cue such that a value of the probability assignment for an actual initiative holder is incremented by a constant amount for each incorrect prediction of that initiative holder, while another value of the probability assignment is decremented by the constant amount for another possible initiative holder.

8. The method of claim 1 wherein the adjusting step associates with each probability assignment for each cue a counter which is incremented when a correct prediction is made, and decremented when an incorrect prediction is made.

9. The method of claim 8 wherein if the counter for a given cue is negative, the counter is reset to zero, and the probability assignment associated with a given cue is adjusted such that a value of the probability assignment for an actual initiative holder is incremented by a constant amount for each incorrect prediction of that initiative holder, while another value of the probability assignment is decremented by the constant amount for another possible initiative holder.

10. The method of claim 8 wherein the value of the counter is used to determine an amount of adjustment for one or more values of a given probability assignment.

11. The method of claim 10 wherein the probability assignment associated with a given cue is adjusted such that a value of the probability assignment for an actual initiative holder is incremented by $\Delta/2^{count+1}$ for each incorrect prediction of the actual initiative holder, while another value of the probability assignment is decremented by $\Delta/2^{count+1}$ for another possible initiative holder, where $\Delta$ is a constant and count is the value of the counter.

12. An apparatus for use in a processing system for tracking shifts in initiative during a dialogue, the dialogue including a sequence of turns, the apparatus comprising:

an input device for processing an input signal representing one of speech and text associated with at least a portion of the dialogue;

a processor coupled to the input device and responsive to the input signal operative to predict in conjunction with a current turn of the dialogue at least one of a task initiative holder and a dialogue initiative holder for a next turn of the dialogue, using at least one cue observed during the current turn, and a probability assignment associated with the observed cue, and to adjust the probability assignment associated with the observed cue if at least one of the predicted task and dialogue initiative holders do not agree with corresponding respective actual task and dialogue initiative holders for the next turn of the dialogue; and a memory coupled to the processor for storing the probability assignment in the form of a signal for subsequent use in predicting initiative shifts in another dialogue.

13. The apparatus of claim 12 wherein the processor is further operative to compute at least one of a task initiative index and a dialogue initiative index for the current turn of the dialogue, using (i) the at least one cue observed during the current turn, (ii) the probability assignment associated with the observed cue, and (iii) a current value of at least one of the task initiative index and the dialogue initiative index, and further wherein the processor predicts at least one of the task initiative holder and the dialogue initiative holder for the next turn of the dialogue, using at least one of the task initiative index and the dialogue initiative index computed for the current turn.

14. The apparatus of claim 13 wherein the current value of at least one of the task initiative index and the dialogue initiative index includes initial values of the task initiative index and the dialogue initiative index assigned prior to performing the compute, predict and adjust operations for a first turn of the dialogue.

15. The apparatus of claim 12 wherein each of the probability assignments assigns a value in the range (0,1) to each of a plurality of possible initiative holders, such that the values for all the possible initiative holders sum to 1, and the value assigned to a given initiative holder indicates the amount of support a corresponding cue provides for the given initiative holder actually holding the initiative in the dialogue.

16. The apparatus of claim 12 wherein the processor is further operative to repeat the predict and adjust operations for each of a plurality of turns of the dialogue, while swapping roles of speaker and hearer for each turn.

17. The apparatus of claim 12 wherein the processor performs the predict and adjust operations for each of a plurality of turns of a first dialogue in order to determine appropriate probability assignments for a given set of cues, and then uses the resulting probability assignments to predict initiative shifts in a second dialogue.

18. The apparatus of claim 12 wherein the processor is operative to adjust the probability assignment associated with a given cue such that a value of the probability assignment for an actual initiative holder is incremented by a constant amount for each incorrect prediction of that initiative holder, while another value of the probability assignment is decremented by the constant amount for another possible initiative holder.

19. The apparatus of claim 12 wherein the processor is operative to associate with each probability assignment for each cue a counter which is incremented when a correct prediction is made, and decremented when an incorrect prediction is made.

20. The apparatus of claim 19 wherein if the counter for a given cue is negative, the processor resets the counter to zero, and adjusts the probability assignment associated with a given cue such that a value of the probability assignment for an actual initiative holder is incremented by a constant amount for each incorrect prediction of that initiative holder, while another value of the probability assignment is decremented by the constant amount for another possible initiative holder.

21. The apparatus of claim 19 wherein the processor is operative to utilize the value of the counter to determine an amount of adjustment for one or more values of a given probability assignment.

22. The apparatus of claim 21 wherein the processor adjusts the probability assignment associated with a given cue such that a value of the probability assignment for an actual initiative holder is incremented by $\Delta/2^{count+1}$ for each incorrect prediction of the actual initiative holder, while another value of the probability assignment is decremented by $\Delta/2^{count+1}$ for another possible initiative holder, where $\Delta$ is a constant and count is the value of the counter.

23. A processing system for tracking shifts in initiative during a dialogue using a set of cues, the dialogue including a sequence of turns, the system comprising:

a speech recognition unit for converting an input speech signal representing at least a portion of an actual dialogue to a digital format, wherein during a dialogue mode of operation the processing system acts as a participant in the actual dialogue;

a processor having an input coupled to an output of the speech recognition unit for receiving the converted speech signal therefrom, wherein during a training mode of operation the processor is operative to predict in conjunction with a current turn of a training dialogue at least one of a task initiative holder and a dialogue initiative holder for a next turn of the training dialogue, using at least one cue observed during the current turn, and a probability assignment associated with the observed cue, and to adjust the probability assignment associated with the observed cue if at least one of the predicted task and dialogue initiative holders do not agree with corresponding respective actual task and dialogue initiative holders for the next turn of the training dialogue;

a memory coupled to the processor for storing the probability assignment and the task and dialogue initiative indices; and a speech synthesizer having an input coupled to an output of the processor, the speech synthesizer receiving output signals from the processor corresponding to portions of the actual dialogue;

wherein during the training mode of operation the processor performs the predict and adjust operations for each of a plurality of turns of the training dialogue in order to determine appropriate probability assignments for a given set of cues, and then uses the resulting probability assignments to predict initiative shifts when the system is acting as a participant in the actual dialogue during the dialogue mode of operation.

24. A method for use in a processing system for tracking shifts in initiative during a dialogue, the dialogue including a sequence of turns, the method comprising the steps of:

receiving an input signal representing one of speech and text associated with at least a portion of the dialogue;

identifying the presence of at least one cue in a current turn of the dialogue associated with the input signal;

predicting in conjunction with the current turn of the dialogue at least one of a task initiative holder and a dialogue initiative holder for a next turn of the dialogue, using the at least one cue and a probability assignment associated with that cue; and generating an output signal for sensory perception corresponding to portions of the dialogue, such that the processing system acts as a participant in the dialogue.

25. The method of claim 24 further including the step of computing in conjunction with the current turn of the dialogue at least one of a task initiative index and a dialogue initiative index for the next turn of the dialogue, using (i) the at least one cue from the current turn, (ii) the probability assignment associated with the at least one cue, and (iii) a current value of at least one of the task initiative index and the dialogue initiative index, and wherein the predicting step includes predicting at least one of the task initiative holder and the dialogue initiative holder for the next turn of the dialogue, using at least one of the task initiative index and dialogue initiative index computed for the next turn.

26. The method of claim 25 wherein the current value of at least one of the task initiative index and the dialogue initiative index includes initial values of the task initiative index and the dialogue initiative index assigned prior to performing the computing and predicting steps for a first turn of the dialogue.

27. The method of claim 24 wherein the probability assignment assigns a value in the range (0,1) to each of a plurality of possible initiative holders, such that the values for all the possible initiative holders sum to 1, and the value assigned to a given initiative holder indicates the amount of support a corresponding cue provides for the given initiative holder actually holding the initiative in the dialogue.

28. An apparatus for use in a processing system for tracking shifts in initiative during a dialogue, the dialogue including a sequence of turns, the apparatus comprising:

an input device for processing an input signal representing one of speech and text associated with at least a portion of the dialogue;

a processor coupled to the input device and responsive to the input signal operative to identify the presence of at least one cue in a current turn of the dialogue, and to predict in conjunction with the current turn of the dialogue at least one of a task initiative holder and a dialogue initiative holder for a next turn of the dialogue, using the at least one cue and a probability assignment associated with that cue;

a memory coupled to the processor for storing the probability assignment; and an output device coupled to the processor for providing a sensory perceptible signal corresponding to portions of the dialogue in response to at least one output signal received from the processor, such that the processing system acts as a participant in the dialogue.

29. The apparatus of claim 28 wherein the processor is further operative to compute at least one of a task initiative index and a dialogue initiative index for the current turn of the dialogue, using (i) the at least one cue from the current turn, (ii) the probability assignment associated with the at least one cue, and (iii) a current value of at least one of the task initiative index and the dialogue initiative index, and further wherein the processor predicts at least one of the task initiative holder and the dialogue initiative holder for the next turn of the dialogue, using at least one of the task initiative index and the dialogue initiative index computed for the current turn.

30. The apparatus of claim 29 wherein the current value of at least one of the task initiative index and the dialogue initiative index includes initial values of the task initiative index and the dialogue initiative index assigned prior to performing the compute and predict operations for a first turn of the dialogue.

31. The apparatus of claim 28 wherein the probability assignment assigns a value in the range (0,1) to each of a plurality of possible initiative holders, such that the values for all the possible initiative holders sum to 1, and the value assigned to a given initiative holder indicates the amount of support a corresponding cue provides for the given initiative holder actually holding the initiative in the dialogue.

32. A processing system for tracking shifts in initiative during a dialogue using a set of cues, the dialogue including a sequence of turns, the system comprising:

a speech recognition unit for converting an input speech signal representing at least a portion of a dialogue to a digital format;

a processor having an input coupled to an output of the speech recognition unit for receiving the converted speech signal therefrom, wherein the processor is operative to predict in conjunction with a current turn of the dialogue at least one of a task initiative holder and a dialogue initiative holder for a next turn of the dialogue, using at least one cue observed during the current turn, and a probability assignment associated with the at least one cue;

a memory coupled to the processor for storing the probability assignment; and a speech synthesizer having an input coupled to an output of the processor, the speech synthesizer receiving output signals from the processor corresponding to portions of the dialogue, such that the processing system acts as a participant in the dialogue.

33. A method for use in a processing system for tracking shifts in initiative during a dialogue, the dialogue including a sequence of turns, the method comprising the steps of:

predicting in conjunction with a current turn of the dialogue, in response to receipt of an input signal representing one of speech and text associated with a portion of the dialogue, at least one of a task initiative holder and a dialogue initiative holder for a next turn of the dialogue, using at least one cue observed during the current turn, and a probability assignment associated with the observed cue; and adjusting the probability assignment associated with the observed cue if at least one of the predicted task initiative holder and predicted dialogue initiative holder do not agree with corresponding respective actual task and dialogue initiative holders for the next turn of the dialogue, the probability assignment being represented by a signal for storage and subsequent use in predicting initiative shifts in another dialogue.

34. An article of manufacture for use in a processing system for tracking shifts in initiative during a dialogue, the dialogue including a sequence of turns, comprising a machine readable medium containing one or more programs which when executed implement the steps of:

predicting in conjunction with a current turn of the dialogue, in response to receipt of an input signal representing one of speech and text associated with a portion of the dialogue, at least one of a task initiative holder and a dialogue initiative holder for a next turn of the dialogue, using at least one cue observed during the current turn, and a probability assignment associated with the observed cue; and adjusting the probability assignment associated with the observed cue if at least one of the predicted task initiative holder and predicted dialogue initiative holder do not agree with corresponding respective actual task and dialogue initiative holders for the next turn of the dialogue.

35. A method for use in a processing system for tracking shifts in initiative during a dialogue, the dialogue including a sequence of turns, the method comprising the steps of:

identifying the presence of at least one cue in a current turn of the dialogue, in response to receipt of an input signal representing one of speech and text associated with a portion of the dialogue; and predicting in conjunction with the current turn of the dialogue at least one of a task initiative holder and a dialogue initiative holder for a next turn of the dialogue, using the at least one cue and a probability assignment associated with that cue for predicting initiative shifts in the dialogue in which the processing system acts as a participant in the dialogue by generation of an output signal for sensory perception corresponding to portions of the dialogue.

36. An article of manufacture for use in a processing system for tracking shifts in initiative during a dialogue, the dialogue including a sequence of turns, comprising a machine readable medium containing one or more programs which when executed implement the steps of:

identifying the presence of at least one cue in a current turn of the dialogue, in response to receipt of an input signal representing one of speech and text associated with a portion of the dialogue; and predicting in conjunction with the current turn of the dialogue at least one of a task initiative holder and a dialogue initiative holder for a next turn of the dialogue, using the at least one cue and a probability assignment associated with that cue.

* * * * *